(12) United States Patent
Leon et al.

(10) Patent No.: US 7,153,115 B2
(45) Date of Patent: Dec. 26, 2006

(54) OPTICAL FIBER COOLING TUBE

(75) Inventors: Aurélien Leon, Paris (FR); Denis Tschumperle, Conflans (FR); Olivier Schuepbach, Hickory, NC (US); Jean-François Bourhis, Taverny (FR)

(73) Assignee: Alcatel, Paris (FR)

( * ) Notice: Subject to any disclaimer, the term of this patent is extended or adjusted under 35 U.S.C. 154(b) by 553 days.

(21) Appl. No.: 10/406,263

(22) Filed: Apr. 4, 2003

(65) Prior Publication Data
US 2003/0188556 A1    Oct. 9, 2003

(30) Foreign Application Priority Data
Apr. 8, 2002    (FR) .................................. 02 04344

(51) Int. Cl.
*C03B 37/10* (2006.01)

(52) U.S. Cl. ...................... 425/72.2; 425/445; 34/435; 65/513; 261/147

(58) Field of Classification Search ................ 425/445, 425/72.2, 72.1; 65/513, 434; 34/435, 62; 261/147; 62/186, 314, 404, 414, 410, 419, 62/427
See application file for complete search history.

(56) References Cited

U.S. PATENT DOCUMENTS

| | | | |
|---|---|---|---|
| 2,161,354 A * | 6/1939 | Imray, Jr. et al. ............ 264/129 |
| 2,847,704 A * | 8/1958 | Scheers ................. 264/211.14 |
| 3,110,547 A * | 11/1963 | Emmert ................. 264/211.17 |
| 3,999,909 A * | 12/1976 | Schippers .................. 425/72.2 |
| 4,761,168 A | 8/1988 | Blyler, Jr. et al. |
| 4,966,615 A * | 10/1990 | Linden et al. ................. 65/510 |
| 5,897,682 A * | 4/1999 | Koaizawa et al. ............ 65/489 |
| 6,444,151 B1 * | 9/2002 | Nguyen et al. ............. 264/101 |
| 6,546,758 B1 * | 4/2003 | Schuepbach ................. 65/510 |

FOREIGN PATENT DOCUMENTS

| | | | |
|---|---|---|---|
| DE | 3741135 | * | 6/1988 |
| DE | 3910252 A1 | | 10/1990 |
| EP | 0579388 A1 | | 1/1994 |
| JP | 1010360 | | 4/1998 |

* cited by examiner

*Primary Examiner*—Joseph S. Del Sole
(74) *Attorney, Agent, or Firm*—Sughrue Mion, PLLC

(57) ABSTRACT

An optical fiber cooling tube includes an internal cavity through which an optical fiber passes and a set of injection passages that are distributed along the tube, open into the cavity, and are oriented in a contraflow direction relative to the direction in which the optical fiber moves.

21 Claims, 3 Drawing Sheets

OPTICAL FIBER COOLING TUBE

CROSS-REFERENCE TO RELATED APPLICATIONS

This application is based on French Patent Application No. 02 04 344 filed Apr. 8, 2002, the disclosure of which is hereby incorporated by reference thereto in its entirety, and the priority of which is hereby claimed under 35 U.S.C. §119.

BACKGROUND OF THE INVENTION

1. Field of the Invention

The field of the invention is that of optical fiber cooling tubes, i.e. cooling tubes for cooling optical fibers during drawing thereof. An optical fiber is drawn from a preform placed in a furnace. At the exit from the furnace, the optical fiber is at a very high temperature and cannot be cooled quickly before its temperature has fallen to around 600° C. Also, the optical fiber is yet to receive a cladding, which cannot be applied until the temperature of the optical fiber has fallen below 100° C., typically to around 70° C. The cooling tube is usually located between the exit from the furnace and the device for applying the cladding to the optical fiber, and its function is to cool considerably, typically from 500° C. to less than 100° C., over a short distance, typically less than 4 m or even 2 m, an optical fiber whose drawing speed can be high, for example 1 500 meters per minute (mpm) or more. During drawing, because of the short cooling distance and the high drawing speed, the time for which the optical fiber remains in the cooling tube is very short, typically of the order of a few tenths of a second, which implies the use of particularly efficient cooling tubes. The cooling tubes operate by circulating a gas with a higher thermal conductivity than air, typically helium, although other gases can be envisaged. The higher the drawing rate, the higher the flowrate of helium necessary to achieve a given cooling efficiency.

2. Description of the Prior Art

A first prior art cooling tube for use at low drawing speeds consists of an elongate cavity surrounding the optical fiber over a distance of 3 m to 4 m and at the entry end of which helium is injected. The consumption of helium is reasonable, not exceeding a few tens of liters per minute. This kind of tube is long, however, and becomes inefficient as the drawing speed increases.

A second prior art cooling tube, described in U.S. Pat. No. 4,761,168, for example, for use at higher drawing speeds, has a large cavity studded with spikes intended to disrupt the boundary layer entrained with the optical fiber. During drawing, the optical fiber passes through the cooling tube at a particular speed and entrains with it a layer of gas in its immediate vicinity and moving at approximately the same speed; this layer of gas is referred to as the boundary layer and its extent depends on the drawing speed in particular. The boundary layer has the drawbacks of consisting mainly of air, whose thermal conductivity is lower than that of helium, and of not mixing much by diffusion with the remainder of the gas between the optical fiber and the walls of the cooling tube cavity, which greatly reduces the efficiency of heat exchange between the optical fiber and the injected helium. Nevertheless, for high drawing speeds, typically from 1 500 mpm to 1 800 mpm, cooling rapidly consumes a prohibitive quantity of helium, assuming that cooling can remain sufficiently efficient over a short cooling distance.

The invention proposes a solution based on a cooling tube of improved cooling efficiency that is particularly beneficial at high drawing speeds. The cooling tube has a structure such that helium can be injected repeatedly along the tube in a contraflow direction relative to the direction in which the optical fiber moves.

SUMMARY OF THE INVENTION

The invention provides an optical fiber cooling tube including an internal cavity adapted to have an optical fiber passed through it and a set of injection passages that are distributed along the tube, open into the cavity, and are oriented in a contraflow direction relative to the direction in which the optical fiber moves.

To optimize the quantity of helium injected, in terms of heat exchange with the optical fiber, i.e. to replace firstly the air and then the heated helium as soon as possible and as often as possible with cold helium, the structure of the cooling tube includes either or advantageously both of the following features: firstly, proximity of the walls of the cavity to the boundary layer at the location of the injection passages, in order to inject the cold helium more efficiently, and, secondly, an alternating arrangement of injection channels and aspiration channels, all of which are oriented in a contraflow direction relative to the direction of movement of the optical fiber, in order to aspirate the air or heated helium more efficiently, this alternating arrangement being associated with a small number of openings to the outside so that little air enters the cooling tube. The proposed cooling tube can be either the same length as and more efficient than those of the prior art or shorter and as efficient, or represent a compromise between those two possibilities. A short cooling tube is advantageous because it reduces the height of the fiber drawing tower.

According to the invention, it is preferable if the cavity has a cross section that is sufficiently narrow at the injection passages for an exterior surface of a boundary layer of gas entrained by the optical fiber when the tube is in use to be closer to the cavity walls than to an exterior surface of the optical fiber and if the tube further includes a set of aspiration passages that are distributed along the tube, open into the cavity and are oriented in a contraflow direction relative to the direction in which the optical fiber moves, the injection groups, of which there are at least three each comprising one or more injection passages, alternating along the tube with the aspiration groups, of which there are at least three each comprising one or more aspiration passages, the only openings to the outside of the tube being the injection passages, the aspiration passages and the ends of the tube.

Alternatively, according to the invention, the cavity has a cross section that is sufficiently narrow at the injection passages for an exterior surface of a boundary layer of gas entrained by the optical fiber when the tube is in use to be closer to the cavity walls than to an exterior surface of the optical fiber.

Also alternatively, according to the invention, the tube further includes a set of aspiration passages that are distributed along the tube, open into the cavity and are oriented in a contraflow direction relative to the direction in which the optical fiber moves, the injection groups, of which there are at least three each comprising one or more injection passages, alternating along the tube with the aspiration groups, of which there are at least three each comprising one or more aspiration passages, the only openings to the outside of the tube being the injection passages, the aspiration passages and the ends of the tube.

The invention will be better understood and other features and advantages will become apparent in the course of the following description and from the accompanying drawings, which are provided by way of example.

DETAILED DESCRIPTION OF THE PREFERRED EMBODIMENT

Figure 1:
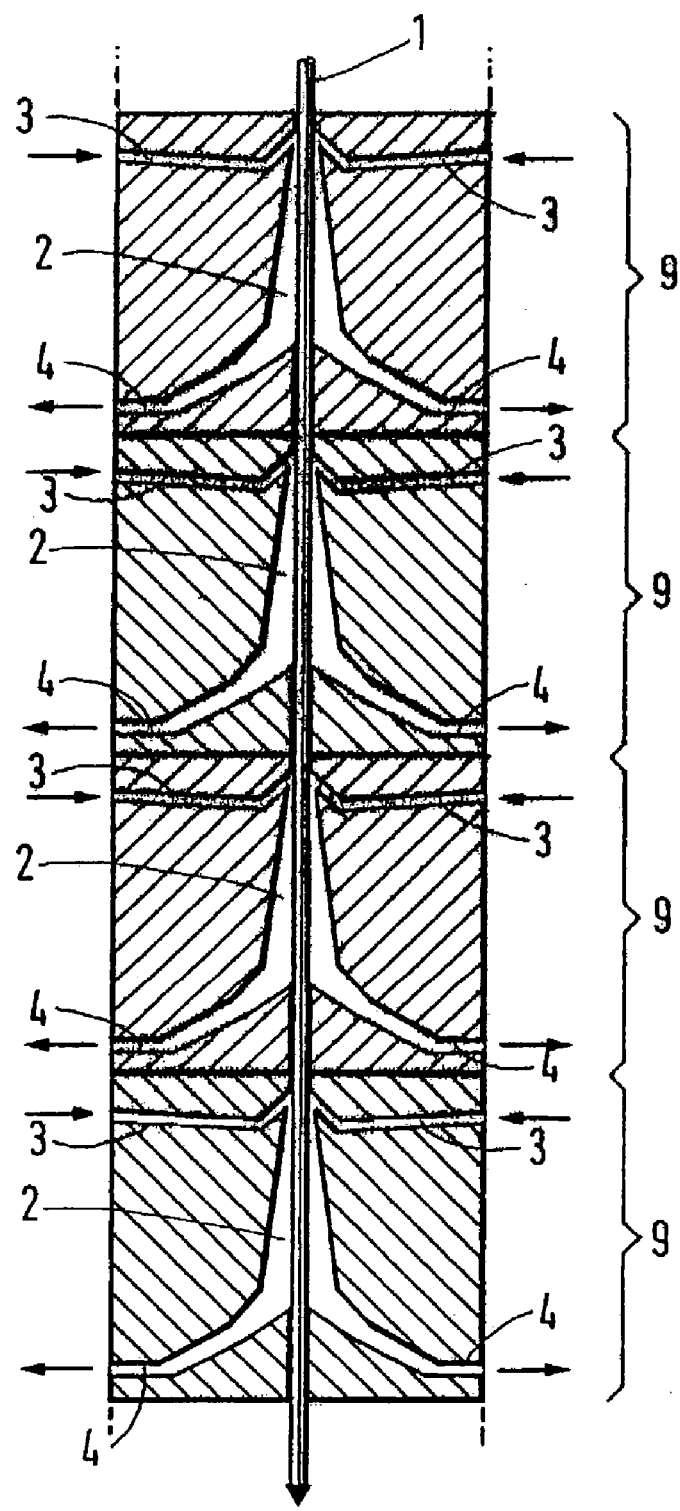
FIG. 1 shows diagrammatically a preferred embodiment of a cooling tube according to the invention consisting of stacked modules.

FIG. 1 shows diagrammatically a preferred embodiment of a cooling tube according to the invention obtained by stacking a plurality of modules. For clarity and simplicity, FIG. 1 shows only four modules, but a real cooling tube will often contain a greater number of modules, advantageously around 12 modules in the case of a tube about half a meter long. When the tube is in use, an optical fiber 1 passes through the cooling tube from top to bottom, the arrowhead at the end of the optical fiber 1 indicating its direction of movement, which is from top to bottom as shown in FIG. 1. The optical fiber 1 moves inside an internal cavity 2 of the cooling tube. The modules 9 are assembled so that the interfaces between the modules is airtight, for example by means of a system of seals disposed at the interfaces between the modules 9. For clarity and simplicity, the prior art mortise and tenon system and the sealing system are not shown in FIG. 1. Outside air can nevertheless enter the internal cavity 2 at the ends of the cooling tube, i.e. where the optical fiber 1 enters the first module 9 and exits the last module 9. This subdivision of the cooling tube into several or many small modules 9 is advantageous from the point of view of facilitating both manufacture of the individual modules 9 and installation of the cooling tubes, whose length can be chosen by choosing the number of modules 9 to be placed end to end, as well as from the point of view of cooling tube maintenance. Each module 9 includes a plurality of injection passages 3 that open into the chamber 2 at an orifice in the same axial position relative to the tube and at a radial position that is regularly distributed relative to the tube, so that in a section plane perpendicular to the optical fiber 1 the distribution of the injection passages 3 is axially symmetrical with respect to the optical fiber 1, the set of injection passages constituting an injection group. In FIG. 1, each module includes only one injection group, in turn including two injection passages 3. The injection passages 3 are oriented in the contraflow direction relative to the direction of movement of the optical fiber 1, being oriented upward rather than downward. The injection passages 3 are oriented in the contraflow direction relative to the direction of movement of the optical fiber 1 to improve the breaking up of the boundary layer and the replacement of air or heated helium by cold helium, in particular in the boundary layer. The cold helium is helium at room temperature, for example, i.e. at the temperature of the medium outside the cooling tube. Each module 9 includes a plurality of aspiration passages 4 which open into the chamber 2 at an orifice which has the same axial position relative to the tube and a radial position regularly distributed with respect to the tube, the set of aspiration passages constituting an aspiration group. In FIG. 1, each module includes only one aspiration group including two aspiration passages 4. The aspiration passages are oriented in the contraflow direction relative to the direction of movement of the optical fiber 1, being oriented upward rather than downward. The aspiration passages 4 are oriented in the contraflow direction relative to the direction of the optical fiber 1 for more efficient evacuation of the remaining air or heated helium, in particular in the boundary layer. The injection passages 3 are oriented in the same direction as the aspiration passages 4. All of the injection passages 3 on the same side of the tube, for example to the left or to the right of the optical fiber 1, are preferably connected to the same feeder passage, not shown in FIG. 1. All of the aspiration passages 4 on the same side of the tube, for example on the left or on the right of the optical fiber 1, are preferably connected to the same evacuation passage, not shown in FIG. 1.

Figure 2:
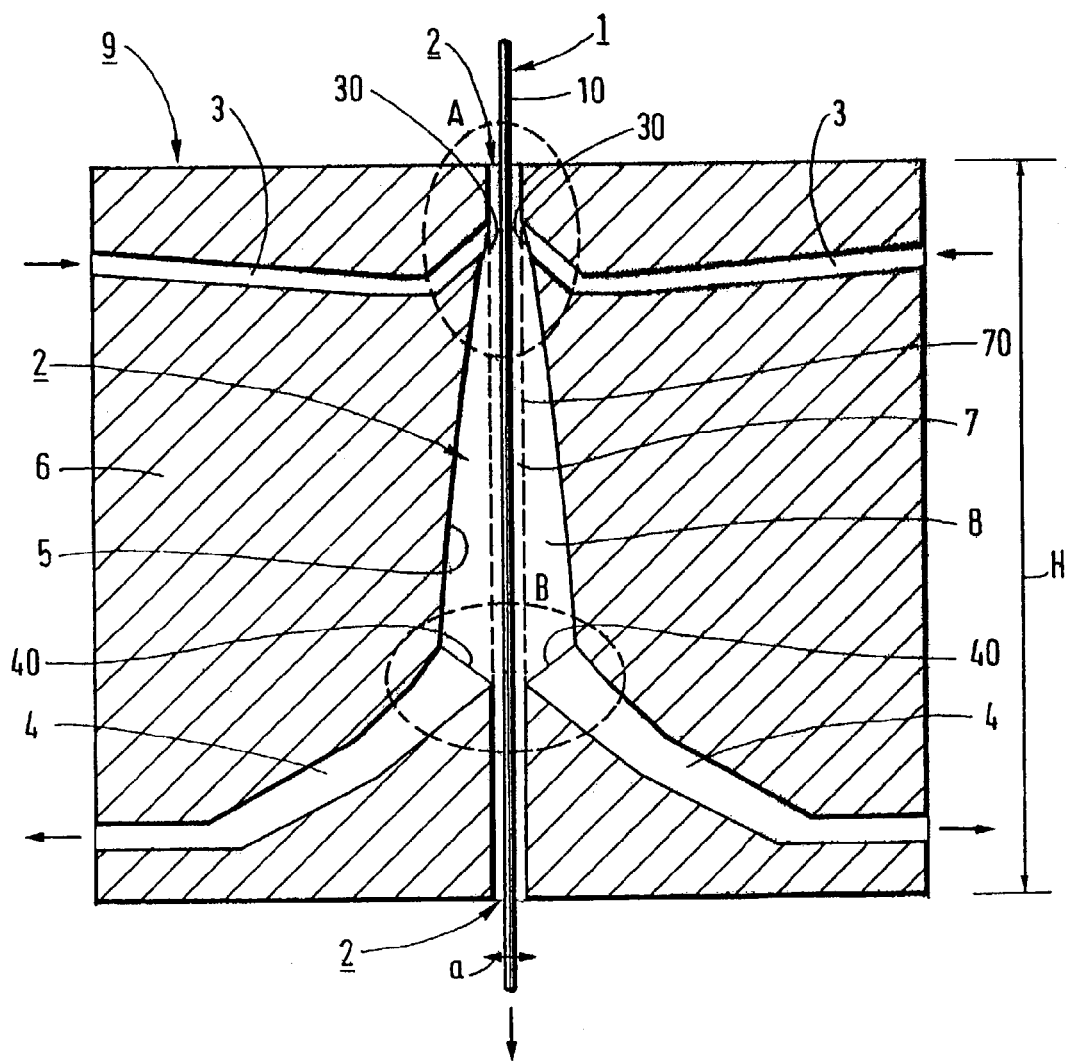
FIG. 2 shows diagrammatically one of the modules of the FIG. 1 cooling tube.

FIG. 2 shows diagrammatically in section one of the modules of the cooling tube shown in FIG. 1. The module shown is axially symmetrical with respect to the axis of the optical fiber 1, and its exterior shape can be that of a parallelepiped, for example, or that of a cylinder. The arrows indicate the direction of flow of the gas in the injection passages 3 and the aspiration passages 4. When the cooling tube is in use, an optical fiber 1 which has an exterior surface 10 passes through the module shown in FIG. 2 along its axis of symmetry. The module is made of a material 6 that is a good conductor of heat, for example a metal, through which passes vertically an internal cavity 2 whose section can vary along the axis of the module. From the top downward, the internal cavity 2 is initially of constant and narrow section, then widens at the orifices 30 of the injection passages 3 to form a chamber 8, and finally narrows again at the orifices 40 of the aspiration passages 4, after which the section remains constant to the exit from the module. The cross section of the internal cavity 2 is the section of the cavity in a plane perpendicular to the optical fiber 1. The dashed lines 7 symbolize the boundary layer carried by the downward moving optical fiber 1, as indicated by the arrowhead at the end of the optical fiber 1. In the FIG. 2 module, the section of the internal cavity 2 is of the same order of magnitude as that of the boundary layer 7, which has an exterior surface 70. This is true only for a range of drawing speeds, since the extent of the boundary layer 7 increases with the drawing speed, and in this example the sections of the internal cavity 2 and the boundary layer 7 are of the same order of magnitude for drawing speeds of 1 500 mpm and above. The exterior surface 70 of the boundary layer 7 is therefore much closer to the walls 5 of the cavity 2 than the exterior surface 10 of the optical fiber 1. The injection passages 3 are bent and oriented in the contraflow direction at the orifice 30 through which they open onto the walls 5 of the internal cavity 2. Just like the walls of the injection passages 3 and the aspiration passages 4, the walls 5 of the internal cavity 2 are cooled by circulating a cold liquid, for example cold water, in the material 6, which is not shown here because it is known in the art. The aspiration passages 4 are bent and oriented in the contraflow direction at the orifice 40 through which they open onto the walls 5 of the internal cavity 2. When they reach the internal cavity 2, the injection passages 3 and the aspiration passages 4 are at an angle of approximately 45° to the optical fiber 1. The dashed line area A is the injection area and the dashed line area B is the aspiration area.

When the cooling tube is in use, the gases circulate in the interior of a module in the following manner. A portion of the optical fiber 1 enters the internal cavity 2, entraining with it a portion of the boundary layer 7 surrounding it. The boundary layer 7 consists of air at the entry to the first module, a mixture of air and heated helium at the entry of the second and third modules, and heated helium with at most trace amounts of air at the entry of the fourth and successive modules, with the possible exception of the last two or three modules of the tube, where air can enter via the bottom end of the tube. Cold helium is injected into the injection passages 3 and exits via the orifices 30 to enter the chamber 8 in the vicinity of the optical fiber 1, i.e. in the area A. The cold helium coming from the injection passages 3 breaks up the boundary layer 7 and replaces most of the air and/or heated helium in the boundary layer 7. Inside the chamber 8, the cold helium in the boundary layer 7 significantly improves the efficiency of heat exchange between the optical fiber and its gaseous environment. At the exit from the chamber 8, i.e. in the area B, the cold helium that was injected into the boundary layer 7 at the entry of the chamber 8 has been heated and has expanded in the chamber 8, and some of it is aspirated from the chamber 8 via the orifices 40 and the aspiration passages 4. Only a portion of the heated helium remains in the boundary layer 7 and continues to travel downward in the internal cavity 2 toward the entry of the next module. The chamber 8 obtained by widening the section of the internal cavity 2 optimizes the efficiency of the aspiration passages 4 in the area B; nevertheless, a constant section for the internal cavity 2 over the whole of the height of the module, with the exception of the vicinity of the areas A and B, in which the presence of the passages produces widening, can also be envisaged, and corresponds to FIG. 3, the constant section improving the injection of cold helium, i.e. penetration of cold helium into the boundary layer 7, although this is achieved at the cost of some reduction in the efficiency of the aspiration of heated helium in the area B. In a preferred numerical example, the height H of a module is approximately 40 mm and the diameter a of the boundary layer 7 is approximately 2 mm for a 125 μm diameter optical fiber 1 moving at a speed from approximately 1 500 mpm to approximately 1 800 mpm or above. The extent of the boundary layer 7 depends in particular on the drawing speed and on the size of the cavity 2 that confines the boundary layer 7. The orifices of the injection passages 3 and the aspiration passages 4 are circular and the diameter of the injection passages is 0.5 mm. The section of each injection passage 3 at its orifice 30 is less than the cross section of the boundary layer 7.

Figure 3:
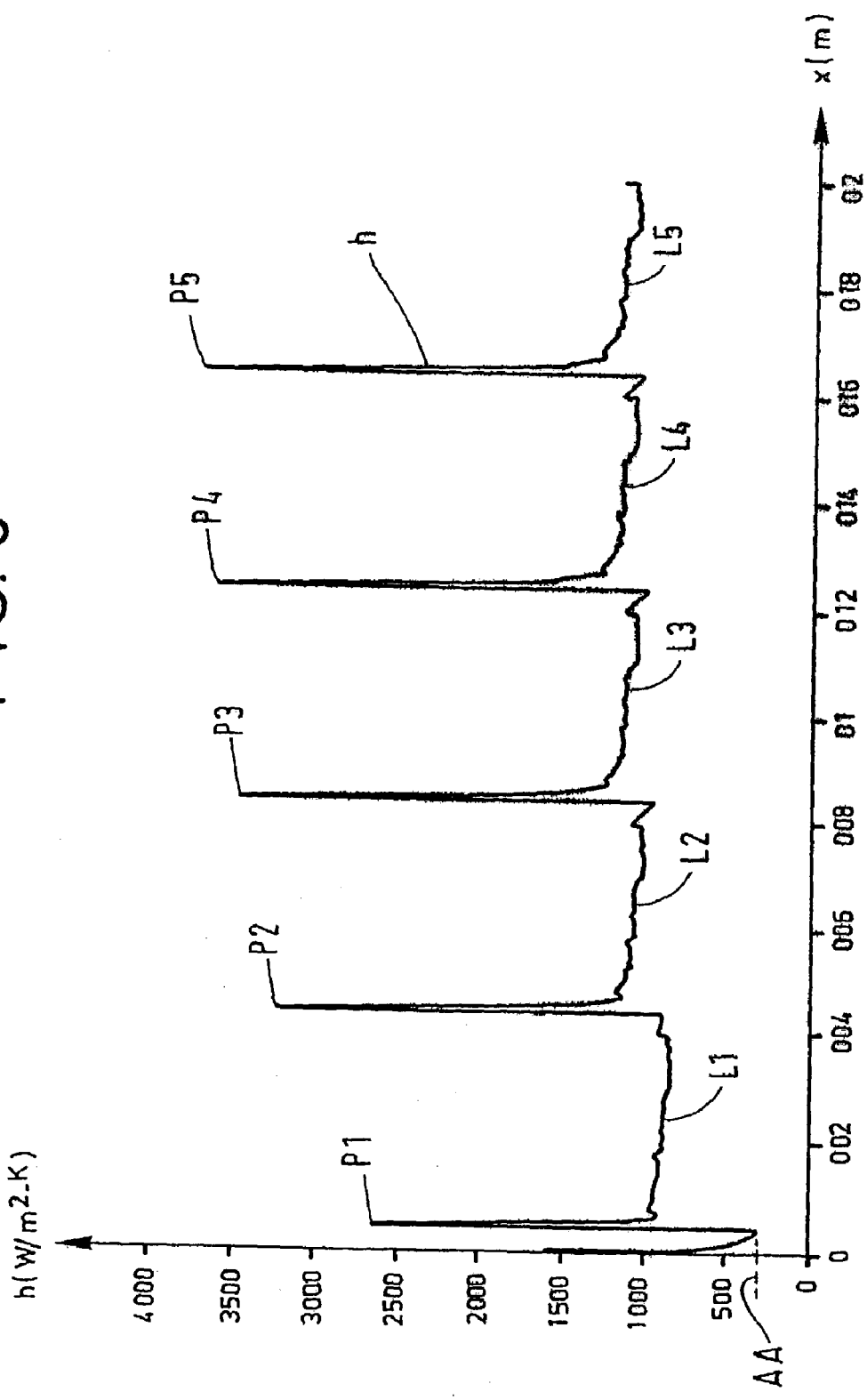
FIG. 3 shows diagrammatically the evolution along one embodiment of a cooling tube according to the invention of the efficiency of heat exchange between the optical fiber and the surrounding gas.

FIG. 3 shows diagrammatically the evolution of the efficiency of heat exchange between the optical chamber and the surrounding helium along one embodiment of a cooling chamber according to the invention. The points on the FIG. 3 curve are represented by small circles. The abscissa axis represents the height x in meters along the axis of the cooling tube, i.e. along the optical fiber 1. The curve h represents the first 20 cm along the cooling tube. The curve h shows the results of a simulation, not actual measurements. The efficiency h is expressed in watts per square meter Kelvin. The overall efficiency of the two portions shown is in fact directly related to the area under the curve h, i.e. its integral. The curve h corresponds to a module height of 40 mm, a drawing speed of 1 800 mpm, an injection flowrate of 10 liters per minute (lpm), an aspiration flowrate of 5 lpm, and a tube with 12 modules. The curve h features peaks P1 to P5 and level (in fact slightly falling) plateaus L1 to L5. The peaks P1 to P5 correspond to the injection areas A in which the injection passages 3 discharge into the internal cavity 2. Breaking up the boundary layer produces in the cold helium injection areas A an efficiency that is much higher than elsewhere, but over a short distance, the peaks P1 to P5 being not only much higher than the plateaus L1 to L5 but also much narrower. The level of the peaks and the mean level of the plateaus increases in the direction along the tube, in other words (for example) the peak P3 is higher than the peak P2, which is in turn higher than the peak P1, and the mean level of the plateau L3 is higher than the mean level of the plateau L2, which is in turn higher than the mean level of the plateau L1; the improvement from one plateau to another is increasingly lower and appears to become negligible after the third plateau L3. The increase in the mean level of the plateaus L1 to L3 corresponds to replacing air in the boundary layer 7 with helium; from the fourth module onward, the air in the internal cavity 2 seems to have practically disappeared. A prior art tube of the second kind would have the efficiency indicated at AA, and would therefore be approximately four times less efficient that the cooling tube according to the invention. For the same efficiency as the second prior art tube, the helium consumption can be divided by a factor of six or more, for example.

The second prior art cooling tube is based on the idea of disturbing the boundary layer 7, whereas the invention seeks to break up the boundary layer 7 and to replace much of the old fluid consisting of air and/or heated helium with new fluid consisting of cold helium everywhere in the boundary layer 7 more than once along the tube, preferably at regular intervals. The injection passages are distributed along the tube, i.e. they occupy different axial positions or positions along the tube, and are preferably regularly distributed along the tube, i.e. their axial spacing or their spacing along the tube is periodic. The helium can be replaced by another gas whose thermal conductivity is higher than that of air and which is injected at a significantly lower temperature than the air. At a drawing speed of 1 500 mpm, which corresponds to a cooling tube entry temperature of approximately 600° C., a set of the second prior art tubes extending over a distance of 2 m would require a flowrate of 250 lpm to cool the optical fiber correctly, whereas a set of tubes according to the invention extending over a distance of 2 m requires only 40 lpm for comparable efficiency, which corresponds, by way of comparison, to an equivalent cooling distance of 7 m in air at room temperature; it seems significantly more efficient to break up the boundary layer rather than simply disturb it. To preserve comparable efficiency, it is also possible to increase the flowrate in the set of tubes according to the invention, but to shorten its length to 1.5 m, for example, by using only three tubes each approximately half a meter long placed end to end, instead of four. A shorter cooling distance would allow the height of the drawing tower to be reduced commensurately.

In a first preferred embodiment of the invention, the cross section of the cavity 2 is sufficiently narrow at the location of the injection passages 3 for the exterior surface 70 of the boundary layer 7 of gas entrained by the optical fiber 1 to be closer there to the walls 5 of the cavity 8 than the exterior surface 10 of the optical fiber 1, and the tube further includes a set of aspiration passages 4 distributed along the tube which open into the cavity 2 and are oriented in the contraflow direction relative to the direction of movement of the optical fiber 1, the injection groups, of which there are at least three, each comprising one or more injection passages 3, alternating along the tube with the aspiration groups, of which there are at least three, each comprising one or more aspiration passages 4, the only openings from the tube to the outside being the injection passages 3, the aspiration passages 4 and the ends of the tube. In this first embodiment, the injection passages 3 often and preferably regularly break up the boundary layer 7 and the aspiration passages 4 repeatedly and preferably regularly aspirate a high proportion of the boundary layer 7. Accordingly, and most of all in the boundary layer 7, the air is first and rapidly replaced with helium and the heated helium is then repeatedly and preferably regularly replaced with cold helium. Minimizing openings of the tube to the outside means that the helium in most of the modules that are not near the ends of the tube is not contaminated much, if at all, and so the helium can either be recycled, subject to a minor purification operation, or purely and simply reinjected without purification, there being practically no air in the corresponding chambers 8.

In an alternative second embodiment of the invention, the cross section of the cavity 2 is sufficiently narrow at the location of the injection passages 3 for the exterior surface 70 of the boundary layer 7 of gases entrained by the optical fiber 1 when the tube is operating to be closer to the walls 5 of the cavity 2 than the exterior surface 10 of the optical fiber 1. For the boundary layer to be broken up, and for large amounts of cold helium to penetrate the boundary layer 7 to be substituted for the heated helium or the remaining air, the flow of injected helium must be fast and close to the optical fiber 1, for which reason the orifices 30 of the injection passages 3 have a relatively small section, to allow a high injection speed in conjunction with a reasonable flowrate, and also situated near the optical fiber 1. However, if the cross section of the cavity becomes too small, very small lateral displacements to which the optical fiber 1 may be subjected may damage it irreparably, in particular by causing it to break. Orifices 30 near the optical fiber 1 when the cavity 2 has a large cross section, typically orifices of injection passages penetrating a long way into the internal cavity 2, give less good results because the resulting large thickness of gas between the optical fiber 1 and the material 6 of the module, the consequence of which is to reduce the efficiency of heat exchanged between the optical fiber 1 and the material 6 via the helium between them. This is why the injection passages 3 advantageously open onto the walls 5 of the cavity 2 and do not enter the cavity 2. In a preferred numerical example of the invention, at a speed of 1 500 mpm, the boundary layer has a diameter of approximately 2 mm, the cross section of the internal cavity 2, which is preferably circular, has a diameter from approximately 2 mm to approximately 3.9 mm, and the surface area of the cross section of the cavity at the location of the injection passages is from approximately 3 mm$^2$ to approximately 10 mm$^2$.

In an alternative third embodiment of the invention, the cooling tube also includes a set of aspiration passages 4 that are distributed along the tube, open into the cavity 2 and are oriented in the contraflow direction relative to the direction of movement of the optical fiber 1, the injection groups, of which there are at least three, each comprising one or more injection passages 3, alternating along the tube with the aspiration groups, of which there are at least three, each comprising one or more aspiration passages 4, the only openings of the tube to the outside being the injection passages 3, the aspiration passages 4 and the ends of the tube. One function of the aspiration passages 4 is to evacuate the remaining air or the heated helium. Regular alternation of the injection groups and the aspiration groups evacuates the heated helium to make room for the next injection of cold helium. Another function of the aspiration passages is to allow recycling with purification and with cooling or simple reinjection of the helium after cooling to economize at a given helium flowrate the quantity of helium consumed by virtue of being lost by dilution to the outside of the cooling tube. Purification consists primarily of eliminating the remaining air and in particular the remaining oxygen. Reducing the number of openings to the outside means that the internal cavity 2 is contaminated with air only at the ends of the tube, authorizing for the centrally positioned modules in the tube either reinjection pure and simple or recycling with slight purification. For example, in the embodiment shown in FIG. 3, which corresponds to the first preferred embodiment, the remaining amount of oxygen after the fifth cell is very low, less than 0.01%. Recycling or reinjection to at least half of the central modules of the tube, for example, is very significant in reducing the consumption of helium at a given flowrate because it helps to reduce significantly the cost of cooling and therefore the cost of the drawing process.

The orifice 30 of the injection passages 3 is preferably of elongate shape, the largest dimension of said orifice 30 being along the axis of the tube, i.e. along the optical fiber 1 when the tube is in use, and the smallest dimension of said orifice being in the direction of the cross section of the tube, i.e. perpendicular to the optical fiber 1 when the tube is in use. Thus the flow of injected cold helium is concentrated along the optical fiber 1 instead of being partly injected farther from the optical fiber 1, as in the case of a circular orifice, for example, which would be less efficient. Compared to a circular orifice with a small section and high flowrate, and for an equivalent overall flowrate, an elongate orifice has the further advantage of distributing the injected gas flow along the optical fiber 1, which therefore vibrates less. The largest dimension is preferably from one and a half times to four times the smallest dimension, and advantageously from twice to three times the smallest dimension, which increases the efficiency of helium injection, in conjunction with a reasonable flowrate, and avoids too small a dimension, which could also have drawbacks. The smallest dimension is advantageously less than 1 mm; the largest dimension is advantageously from 1 mm to 5 mm. For example, the smallest dimension is 0.5 mm and the largest dimension is 1.5 mm, the orifice 30 having an oblong or oval shape. The advantage of an elongate orifice 30 rather than a circular orifice would be to enlarge the peaks P1 to P5 in FIG. 3, which is beneficial because, these peaks being very high but very narrow, this would increase the integral of the curve h and therefore the overall efficiency of heat exchange between the optical fiber 1 and the surrounding gas, and consequently the efficiency of cooling of the optical fiber 1 by the cooling tube. This type of elongate orifice 30 can even be applied to cooling tubes other than that according to the invention.

To break up the boundary layer as efficiently and completely as possible, the injection angle is preferably from 30° to 60°, for example equal to approximately 45°, the injection angle being the angle of orientation of the injection passages 3 at their orifice 30. If the injection angle is closer to 90°, for example equal to 75°, the speed vectors of the optical fiber 1 and the injected cold helium are combined less efficiently to break up the boundary layer 7. If the injection angle is closer to 0°, for example equal to 15°, the distance that the injected cold helium has to travel before reaching the optical fiber 1 is too great. A good optimum compromise is an injection angle of around 45°.

The tube preferably comprises ten or more aspiration groups, for example twelve groups, and for at least half of the aspiration groups farthest from the ends of the tube, for example the six most central aspiration groups, the aspirated gas is either reinjected directly, possibly mixed with a greater or lesser proportion of pure helium to preserve the flowrate, or recycled, whereas, for at least each aspiration group nearest one end of the tube, for example the three aspiration groups nearest each end, the aspirated gas is neither reinjected directly nor recycled. The principle is as follows. When the gas circulates in the internal cavity 2 of a module that is sufficiently central to be not contaminated much, if at all, with air, the gas is advantageously recycled or reinjected, whereas when the gas circulates in the internal cavity 2 in a module that is sufficiently close to the outside to be significantly contaminated with air, the gas is advantageously eliminated. Thus at least some of the helium used is not lost, and can be used again at low cost.

The tube preferably comprises a relatively large number of relatively small modules each comprising a single injection group and a single aspiration group; this is to facilitate fabrication, cleaning and manipulation of the tube, and to optimize the heat exchange distance between the injection of cold helium onto the optical fiber 1 and the aspiration of heated helium out of the vicinity of the optical fiber 1, to make heat exchange between the helium and the optical fiber 1 as efficient as possible. This is why the distance along the tube between an injection passage and an aspiration passage is made less than 100 mm, and is preferably from 10 mm to 50 mm, which corresponds to a height H of the module from approximately 20 mm to approximately 60 mm. Dividing the tube into modules even allows the fabrication of tubes with different lengths comprising a different number of identical modules, at relatively low additional cost. Subdivision into modules also means that some modules can be deactivated by stopping the circulation of helium, if the drawing speed is less than the nominal speed for which complete cooling using all modules was intended. In a preferred numerical example of the invention, the size of a module, i.e. its height H, is 40 mm and the length of the corresponding complete tube comprising twelve modules is approximately half a meter; because the cooling height is approximately 2 m, four tubes are advantageously used in series on a drawing tower, either welded together or not, and each tube having a length of approximately half a meter. It is also possible to use-a tube approximately two meters long and including around fifty modules.

Each injection group preferably comprises either one injection passage 3 or a plurality of injection passages 3 at the same axial position relative to the tube and at regularly distributed radial positions relative to the tube and each aspiration group comprises either one aspiration passage 4 or a plurality of aspiration passages 4 at the same axial position relative to the tube and at regularly distributed radial positions relative to the tube. If the groups comprise only one passage, it is preferable for there to be an alternation of passages of the same type (injection or aspiration) along the tube to eliminate the risk of excessive vibration of the optical fiber 1 by compensating (i.e. slightly increasing or decreasing) the force exerted on the optical fiber 1 at the location of the one passage. To eliminate this risk of excessive vibration of the optical fiber 1 by compensating at the same place the force that would be exerted on the optical fiber 1 at the location of the one passage, it is more advantageous for each group to include a plurality of passages, i.e. two or more passages, the set of passages having axial symmetry relative to the axis of the optical fiber 1 when the tube is in use, which axis is also that of the tube.

To simplify fabrication and maintenance of the tube, all the injection passages 3 are preferably connected to a common feeder passage and all the aspiration passages 4 are preferably connected to a common evacuation passage, which minimizes the length of each injection passage 3 or aspiration passage 4.

In FIG. 2 the internal cavity widens to form a chamber between the injection group and the aspiration group, to facilitate extraction of air or heated helium. Some improvement to the efficiency of aspiration is achieved at the cost of some reduction of injection efficiency. In contrast, to give the emphasis to the injection efficiency (i.e. to increase it), the internal cavity narrows to form a bottleneck between the injection group and the aspiration group.

There is claimed:

1. An optical fiber cooling tube comprising:
   an internal cavity having a diameter larger than an outer diameter of an optical fiber passed through the cavity in a flow direction from a first end of the tube to a second end of the tube, which is opposed to the first end;
   injection groups that are distributed along the tube, open into said cavity, and are oriented in a contraflow direction relative to the flow direction in which said optical fiber moves; and
   aspiration groups that are distributed along the tube, open into said cavity and are oriented in the contraflow direction relative to the flow direction in which said optical fiber moves,
   said injection groups, of which there are at least three each comprising one or more injection passages, alternating along said tube with said aspiration groups, of which there are at least three each comprising one or more aspiration passages, the only openings to the outside of the tube being said injection passages, said aspiration passages and the first and second ends of said tube.

2. The optical fiber cooling tube claimed in claim 1 wherein said cavity has a cross section that is sufficiently narrow at said injection passages for an exterior surface of a boundary layer of gas entrained by said optical fiber when said tube is in use to be closer to the cavity walls than to an exterior surface of said optical fiber, wherein said cross section area of the cavity at said injection passages from 3 mm² to 10 mm².

3. The optical fiber cooling tube claimed in claim 1, wherein each injection group comprises either one injection passage or a plurality of injection passages with the same axial position relative to said tube and regularly distributed radial positions relative to said tube and each aspiration group comprises either one aspiration passage or a plurality of aspiration passages with the same axial position relative to said tube and regularly distributed radial positions relative to said tube.

4. The optical fiber cooling tube claimed in claim 3 wherein all said injection passages are connected to a common feeder passage and all said aspiration passages are connected to a common evacuation passage.

5. The optical fiber cooling tube claimed in claim 1, wherein said internal cavity widens to form a chamber between the injection and aspiration groups.

6. The optical fiber cooling tube claimed in claim 1, wherein said internal cavity narrows to form a bottleneck between the injection and aspiration groups.

7. The optical fiber cooling tube claimed in claim 1, wherein the distance along said tube between the injection and aspiration passages is less than 100 mm.

8. The optical fiber cooling tube claimed in claim 7 wherein the distance along said tube between the injection and aspiration passages is from 10 mm to 50 mm.

9. The optical fiber cooling tube claimed in claim 1, wherein said tube comprises at least ten aspiration groups, for at least half of said aspiration groups farthest from the ends of said tube, the gas aspirated is either reinjected directly or recycled, and, for at least each aspiration group nearest one end of said tube, the gas aspirated is neither reinjected directly nor recycled.

10. The optical fiber cooling tube claimed in claim 1, comprising a plurality of modules each comprising a single injection group and a single aspiration group.

11. The optical fiber cooling tube claimed in claim 2 wherein said injection passages open onto the cavity walls.

12. The optical fiber cooling tube claimed in claim 1, wherein said injection passages open onto the cavity walls.

13. The optical fiber cooling tube claimed in claim 1 wherein said injection passages have elongate orifices, a largest dimension of said orifice is along the axis of said tube, and a smallest dimension of said orifice is the cross section plane of said tube.

14. The optical fiber cooling tube claimed in claim 13 wherein said largest dimension is from one and a half times to four times said smallest dimension.

15. The optical fiber cooling tube claimed in claim 14 wherein said largest dimension is from twice to three times said smallest dimension.

16. The optical fiber cooling tube claimed in claim 13 wherein said smallest dimension is less than 1 mm.

17. The optical fiber cooling tube claimed in claim 16 wherein said largest dimension is from 1 mm to 5 mm.

18. The optical fiber cooling tube claimed in claim 1, wherein an injection angle of said injection groups, which are oriented in the contraflow direction, is from 30 degrees to 60 degrees.

19. The optical fiber cooling tube claimed in claim 18 wherein said injection angle is approximately 45 degrees.

20. The optical fiber cooling tube claimed in claim 1, wherein the injection groups and the aspiration groups are disposed along said tube such that the optical fiber, which is inserted into the first end of the tube and passed through the tube in the flow direction to exit the tube from the second end, first passes an injection passage of the injection groups before passing any aspiration passage of the aspiration group.

21. The optical fiber cooling tube claimed in claim 1, wherein the injection groups and the aspiration groups, which are oriented in the contraflow direction, are angled toward the first end of the tube.

* * * * *